Figure 1:
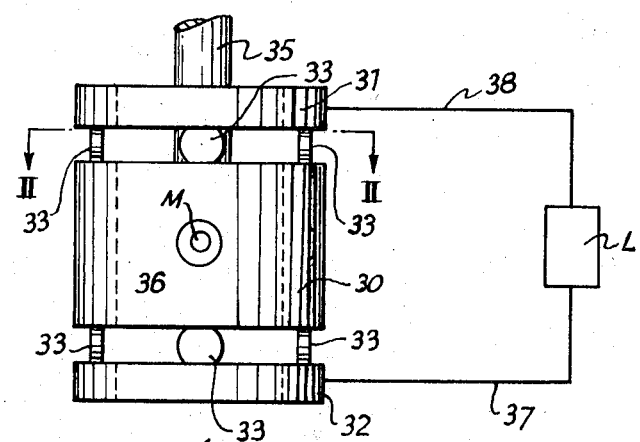

United States Patent

[11] 3,560,773

| [72] | Inventor | Ian Duncan McFarlane<br>Lancaster, England |
|---|---|---|
| [21] | Appl. No. | 645,919 |
| [22] | Filed | June 14, 1967 |
| [45] | Patented | Feb. 2, 1971 |
| [73] | Assignee | National Research Developement Corporation<br>a corporation of the United Kingdom |
| [32] | Priority | June 16, 1966 |
| [33] |  | Great Britain |
| [31] |  | 26,819/66 |

[54] SUPERCONDUCTING DYNAMOELECTRIC MACHINE
6 Claims, 3 Drawing Figs.

[52] U.S. Cl. ............................................. 310/10,
310/52
[51] Int. Cl. ............................................... H02k 9/10
[50] Field of Search........................................ 310/156,
178, 10, 40, 52; 335/216; 340/173.1; 338/325;
307/295, 306, 212, 277; 336/250 SCUXR's

[56] References Cited
UNITED STATES PATENTS

| 3,443,134 | 5/1969 | Dowsett et al. | 310/52X |
| 3,177,369 | 4/1965 | Zotos | 310/156X |
| 3,277,322 | 10/1966 | Berlincourt | 310/40 |
| 3,336,489 | 8/1967 | Volger | 310/40 |
| 3,336,509 | 8/1967 | Atherton | 310/10UX |
| 3,402,307 | 9/1968 | Pearl | 310/10 |

OTHER REFERENCES

" Superconducting D.C. Generators and Motors," Atherton, 12/64, pp 67— 71

*Primary Examiner*—D. F. Duggan
*Attorney*—Cushman, Darby & Cushman

ABSTRACT: Disclosed are method and apparatus for generating a current in a superconducting circuit in the form of a loop by moving a bundle of magnetic flux in such a manner that it threads the superconducting loop while being moved in regions containing no magnetically, irreversible material, with the superconducting properties of the loop being maintained throughout.

Ian Duncan McFarlane
INVENTOR

By Cushman, Darby & Cushman
ATTORNEYS

SUPERCONDUCTING DYNAMOELECTRIC MACHINE

The present invention relates to the production of currents in superconducting circuits.

Two obvious uses for superconducting circuits are (1) the production of very high magnetic fields for which large currents are required and (2) the transmission of electrical power along superconducting lines where again high currents are required. Serious problems are encountered in producing high currents in superconducting circuits by conventional means. If, for example, the current is produced in a circuit at normal temperature, very thick leads will be required to carry it into the superconducting circuit and large quantities of heat will be introduced into the superconducting circuit along these leads giving rise to a refrigeration problem. Attempts have therefore been made to produce generators which are capable of working at low temperatures in the superconducting state and as a result a number of "flux pumps" have been proposed. Basically, the known flux pumps operate by means of "flux valves" in which a part of the superconducting circuit is rendered normally conducting for example by raising its temperature or by subjecting it to a magnetic field greater than a critical value. Magnetic flux can then be introduced into the circuit and its source is subsequently withdrawn after the flux valve has been closed. In this way, a current is induced in the circuit in order to maintain the magnetic flux introduced. If arrangements are made to maintain the already existing current, whilst further magnetic flux is introduced through the flux valve, the process can be repeated and a large current can thus be built up.

However, the majority of flux pumps so far suggested suffer from high losses due either to the finite resistance of the flux valve, or to the losses incurred in the moving of a magnetic field in a region containing magnetically irreversible material.

Although a number of flux pumps utilizing mechanical switches in the superconducting circuit to give flux values of infinite resistance have been proposed, such are not entirely lossless and are prone to mechanical breakdown.

The present invention is based on the realization that it is a practical possibility to generate currents in superconducting circuits by moving a magnetic field in regions containing no magnetically irreversible material.

According to the invention a method of generating a current in a superconducting circuit in the form of a loop comprises the step of moving a bundle of magnetic flux in such a manner that it threads said superconducting loop, the arrangement being such that said bundle is moved throughout in regions containing no magnetically irreversible material, and such that the superconducting properties of the loop are maintained throughout.

The invention also includes apparatus for carrying out the method aforesaid.

The invention will be further apparent from the following description with reference to the several figures of the accompanying drawing which show by way of example only one form of apparatus for generating a current in a superconducting circuit embodying the invention.

Figure 2:
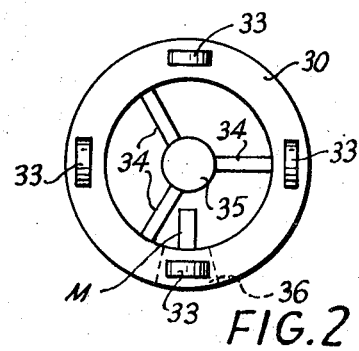
Figure 3:
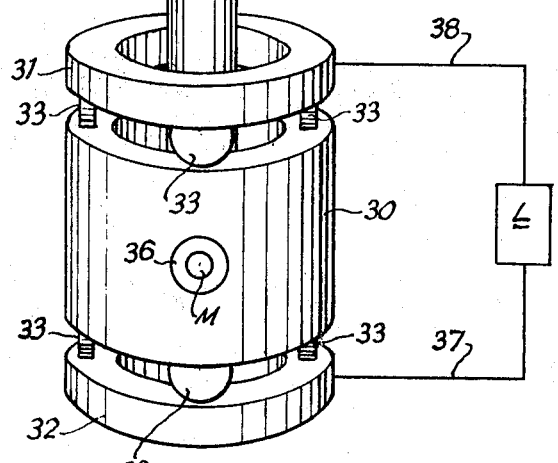

Of the drawing:

FIG. 1 is a diagrammatic side view of the apparatus,
FIG. 2 is a section on the line II–II OF FIG. 1, and
FIG. 3 is a perspective view of the apparatus of FIG. 1.

Referring now to the drawing, it will be seen that the apparatus comprises a hollow cylinder 30 made of lead-bismuth and rotatably mounted between two annular supports 31 and 32 by means of roller bearings 33. The supports 31 and 32 are of lead-bismuth and the roller bearings 33 are made of niobium. The roller bearings run in tracks in the end faces of the cylinder 30 and of supports 31 and 32.

The cylinder 30 is connected by stays 34 to a shaft 35 which serves as a drive shaft.

A radial hole is formed in the wall of the cylinder 30 and a permanent magnet M is mounted in the hole with its field along a radius of the cylinder. The magnets M may conveniently be supported by an insert 36 of epoxy resin.

Superconducting leads 37 of 38 and a coil L are connected to the supports 31 and 32. The part of the apparatus shown in the drawings is immersed in liquid helium at a temperature of 4.2° K thus rendering the roller bearings 33, the cylinder 30, the supports 31 and 32, the leads 38 and 37 and the coil L all superconducting, to form a superconducting loop. The shaft 35 extends out of the liquid helium. This shaft may be hollow and thin walled to reduce inflow of heat to the liquid helium.

When the apparatus has been cooled to form the superconducting loop aforesaid, the Meissner effect constrains the magnetic flux from the inner pole of the magnet M to divide and emerge mostly through the center holes of the annular supports 31 and 32. The lines of flux are linked to the outer pole of the magnet M in a normal manner.

When the shaft 35 is driven to rotate the cylinder 30 and hence the magnet M the lines of magnetic flux are not able to pass the superconducting leads 37 and 38 leading to the coil L. Thus for each revolution of the cylinder 30 almost all the flux from the magnet M is made to thread the superconducting loop and for each revolution a current is induced in the loop in opposition.

It should be noted that the superconducting properties of the loop are maintained throughout, and further that the magnetic flux moves throughout in regions containing no magnetically irreversible material.

If a current has been generated in the coil L with the result that energy is stored in the coil, then the current can be used to cause the cylinder 30 to rotate thus driving the shaft 35. Thus, if L is replaced by power transmission lines and an apparatus similar to that shown is connected at the distant end of the lines, a direct current can be generated in the lines and can be used to drive the distant apparatus.

Any convenient superconducting material may be used for the components of the apparatus, provided that the critical temperature and critical magnetic field are not exceeded. Also, the magnetic field experienced by the roller bearings 33 the cylinder 30 and the supports 31 and 32 should never be great enough to penetrate the surface of these parts.

Apparatus according to the invention need not incorporate the whole of the main superconducting loop. For example, part of this loop may be constituted by power transmission lines which are outside the apparatus.

The rate of increase of the current in the main loop can be increased by increasing the quantity of magnetic flux carried by the magnet, or by increasing the number of magnets. Cylinder 30 could contain any number of holes 36 with magnets in them, provided a superconducting path remains between its faces.

In one modification of the apparatus described the magnet M is replaced by a magnetic field created by electromagnets which can be mounted outside the bath of liquid helium. The apparatus is cooled with the field switched on and in line with the hole in the wall of cylinder 30. Switching off the field after the cylinder becomes superconducting means that magnetic flux is trapped in the hole, which thereafter behaves exactly as though it contained a permanent magnet M.

Although the embodiment of the invention described above employs liquid helium to render the circuits superconducting this is not essential. If materials are used which become superconducting at temperatures above 4.2° K. then other refrigerating media can be employed.

Further, the invention extends to apparatus incorporating materials not in the superconducting state but which become superconducting under suitable conditions if the apparatus is such that under these conditions it can be operated in accordance with the principles outlined above.

I claim:

1. Apparatus for generating a current in a superconducting circuit comprising:
   a superconducting loop,
   a tubular body formed from a conducting material and adapted to form part of said superconducting loop;

means for rotating said tubular body about an axis passing through a bore therethrough in such a manner that said body maintains the circuit of said superconducting loop while being rotated;

means defining at least one hole through the wall of said body; and means for producing a bundle of magnetic flux which passes through said hole whereby when said body is rotated said magnetic flux threads said superconducting loop once for each rotation of said body while yet permitting all of said superconducting loop to maintain its superconducting properties.

2. Apparatus according to claim 1 wherein said tubular body is comprised by a hollow cylindrical member.

3. Apparatus according to claim 2 further including annular conducting supports wherein said hollow cylindrical body is disposed between said annular conducting supports, and electrically conducting bearings being disposed between said supports and the end faces of said hollow cylindrical body.

4. Apparatus according to claim 3 wherein said two supports are connected with leads which form part of said superconducting loop.

5. Apparatus according to claim 1 wherein each said hole in the wall of said hollow body forms a housing for a permanent magnet, which constitutes said means for providing a bundle of magnetic fluxes passing therethrough.

6. Apparatus according to claim 1 wherein each said hole has a permanent current flowing around the periphery thereof on the surface of the superconducting material bounding the hole whereby the hole behaves as a permanent magnet.